(12) United States Patent  
Wagner

(10) Patent No.: US 7,201,428 B2
(45) Date of Patent: Apr. 10, 2007

(54) BOOT LID FOR A CONVERTIBLE VEHICLE

(75) Inventor: Tobias Wagner, Hamburg (DE)

(73) Assignee: Magna Car Top Systems GmbH (DE)

( * ) Notice: Subject to any disclaimer, the term of this patent is extended or adjusted under 35 U.S.C. 154(b) by 0 days.

(21) Appl. No.: 11/333,704

(22) Filed: Jan. 17, 2006

(65) Prior Publication Data

US 2006/0186694 A1    Aug. 24, 2006

Related U.S. Application Data

(63) Continuation of application No. PCT/EP04/08579, filed on Jul. 30, 2004.

(30) Foreign Application Priority Data

Aug. 28, 2003  (DE) ............... 103 40 017

(51) Int. Cl.
    *B60J 7/20*    (2006.01)
(52) U.S. Cl. ..................... 296/107.08; 296/76
(58) Field of Classification Search ........... 296/107.08, 296/76
    See application file for complete search history.

(56) References Cited

U.S. PATENT DOCUMENTS

| 5,823,606 | A  |   | 10/1998 | Schenk et al.    |         |
|-----------|----|---|---------|------------------|---------|
| 6,193,300 | B1 |   | 2/2001  | Nakatomi et al.  |         |
| 6,250,707 | B1 |   | 6/2001  | Dintner et al.   |         |
| 6,293,605 | B2 | * | 9/2001  | Neubrand ......... | 296/76  |
| 6,352,298 | B1 | * | 3/2002  | Hayashi et al. .. | 296/107.08 |
| 6,497,446 | B2 | * | 12/2002 | Obendiek ........ | 296/107.08 |
| 6,497,447 | B1 | * | 12/2002 | Willard .......... | 296/107.08 |
| 6,578,899 | B2 | * | 6/2003  | Hasselgruber et al. | 296/107.08 |
| 6,672,645 | B2 | * | 1/2004  | Quindt ........... | 296/107.08 |
| 6,899,368 | B2 | * | 5/2005  | Neubrand ........ | 296/76 |
| 7,032,952 | B2 | * | 4/2006  | Dilluvio ......... | 296/107.08 |
| 2002/0093218 | A1 | * | 7/2002 | Weissmueller et al. | 296/76 |
| 2002/0140250 | A1 | * | 10/2002 | Hasselgruber et al. | 296/107.08 |
| 2005/0067853 | A1 | * | 3/2005 | Krajenke ......... | 296/76 |
| 2005/0173943 | A1 | * | 8/2005 | Duffy ............. | 296/76 |
| 2005/0285428 | A1 | * | 12/2005 | Dilluvio ......... | 296/107.08 |

FOREIGN PATENT DOCUMENTS

| DE | 19946454     | 4/2000 |
| DE | 19932500     | 2/2001 |
| DE | 10160406     | 6/2003 |
| EP | 1470012      | 10/2004 |
| FR | 2835477      | 8/2003 |
| WO | WO 03064195  | 8/2003 |

* cited by examiner

*Primary Examiner*—Lori L. Coletta
(74) *Attorney, Agent, or Firm*—Brooks Kushman P.C.

(57) ABSTRACT

A rear hood assembly system is proposed for vehicles. The rear hood assembly includes a multi-joint link assembly. The multi-joint link assembly couples the rear hood to a vehicle body. The multi-joint link assembly includes a locking link. The locking link can move between a locked position and an unlocked position. When the locking link is in the locked position, a rotary joint pivotably couples the locking link to the vehicle body to raise the rear edge of the rear hood. When the locking link is in the unlocked position, the rotary joint is unlocked.

15 Claims, 4 Drawing Sheets

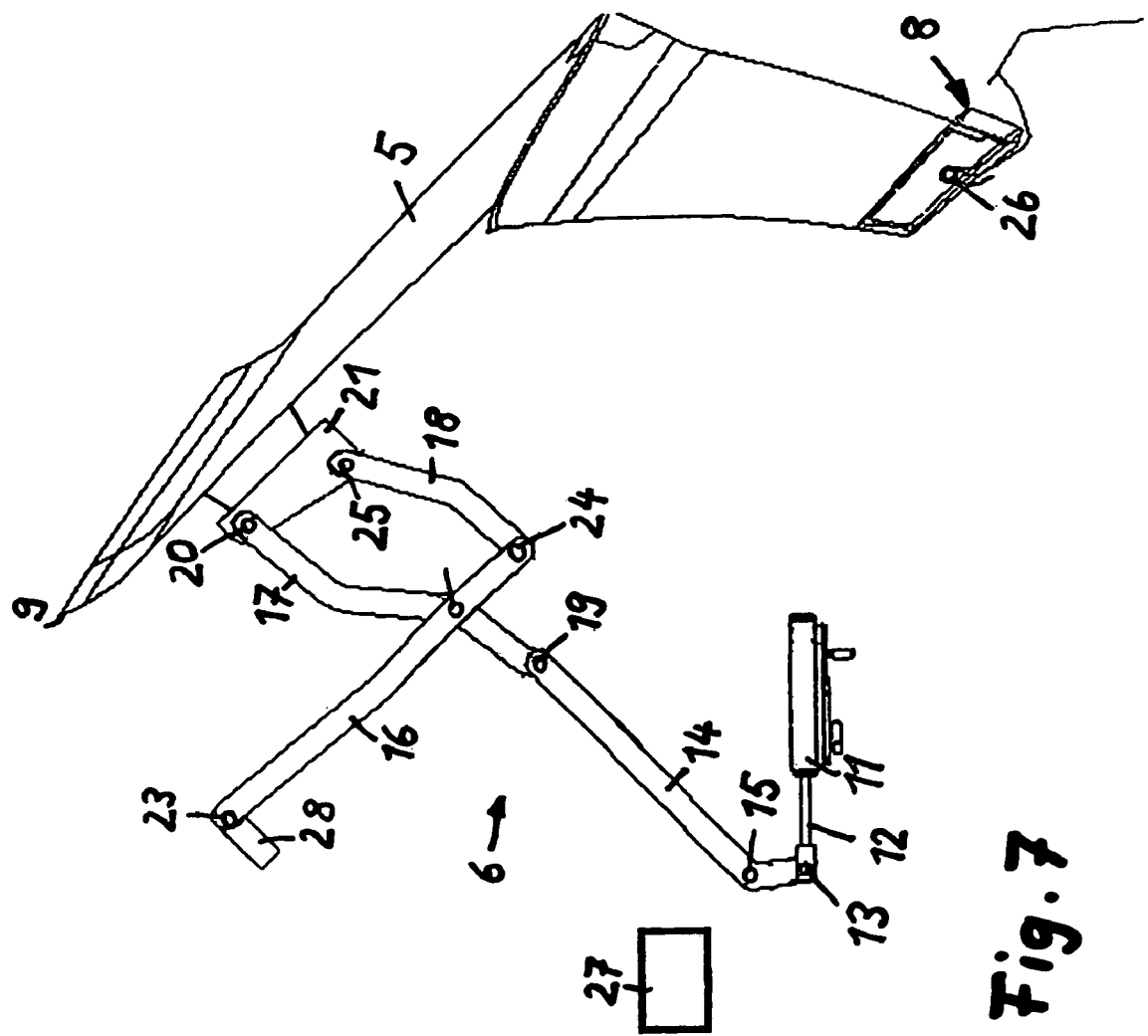

BOOT LID FOR A CONVERTIBLE VEHICLE

CROSS REFERENCE TO RELATED APPLICATION

This application is a continuation of PCT application Ser. No. PCT/EP2004/008579, filed Jul. 30, 2004.

BACKGROUND OF THE INVENTION

1. Field of the Invention

The invention relates to an apparatus for a rear hood of a vehicle that may be opened by raising the front edge or rear edge of the hood.

2. Background Art

German published patent application DE 199 46 454 A1 (U.S. Pat. No. 6,193,300) discloses a trunk lid of a vehicle that may be raised to load a trunk. A seven-joint link assembly connects the trunk lid to a vehicle body. A rear edge of the trunk lid can be manually raised to open the trunk lid. A front edge of the trunk lid can be raised by a motor to stow a foldable vehicle hood. The front edge is adjacent to a vehicle interior. Raising the front edge of the trunk lid provides access to a folding-top compartment for receiving a folding top of the vehicle. A rear locking element retains the trunk lid in its closed position. The trunk lid can be pivoted about a pivot axis located at the rear side to allow the front edge to be raised. The front edge of the trunk lid is erected about pivot axis using an electric motor that acts on a link of the seven-joint link assembly of the trunk lid. In a first movement phase of the trunk lid, a cable pull system is used to release a locking hook located near the front edge of the trunk lid to allow the front edge to be raised. In a subsequent movement phase, the seven-joint link assembly pivots the trunk lid about the rear pivot axis of the trunk lid to raise the front edge.

The locking hook remains in its locked position for loading and unloading the trunk. In the locked position, the hook engages around an articulated shaft of the seven-joint link assembly to prevent the front edge of the trunk lid from raising. While the hook is in its locked position, a locking element in the rear region may be released to allow the rear edge of the trunk lid to be raised manually. A passive spring element can be used to assist the pivoting-out movement used for loading and unloading the trunk. The passive spring element may be a gas-filled compression spring.

One disadvantage of the system disclosed in the above German published patent application is that raising the trunk lid about either the front edge or the rear edge is not fully automatic. The driving motor of the rear opening hood only assists the rasing of the front edge to stow the vehicle folding top.

French published patent application FR 28 35 477A1 discloses an apparatus for opening a rear hood for a convertible. The rear hood can be raised at or near either a front edge or a rear edge to open either a folding-top compartment or a trunk of a vehicle. The folding-top compartment receives a vehicle roof in a stowed position. A multi-joint link assembly is located at or near both the front edge and the rear edge. One of the multi-joint link assemblies is displaced from its locked position to an unlocked position to raise either the front edge or the rear edge. The multi-joint link assemblies located at or near the front edge and the rear edge of the rear opening hood move independent of each other from the functional position to the unlocking position. An adjusting element may displace the rear hood from a closed position to a raised position only after one of the two link assemblies has been released and the corresponding edge has been opened. The same adjusting element may be used to raise both the front edge and the rear edge.

This embodiment has a number of disadvantages. One disadvantage of the system disclosed in the above French published patent application is that it uses two independent link assemblies at or near the front edge and the rear edge of the rear opening hood that significantly increases both structural and adjustment outlay. Each of the two kinematic arrangements must be designed to move between a locked, or functional, position and an unlocked position.

German published patent application DE 199 32 500A1 discloses an apparatus for opening a rear hood for a convertible. A front four-joint link assembly and a rear four-joint link assembly couples the rear hood to the vehicle body. Actuation of the front four-joint link assembly raises the rear edge of the rear hood. Actuation of the rear four-joint link assembly raises the front edge of the rear hood. The front four-joint link assembly and the rear four-joint link assembly share a common lever which is actuated by an actuator.

Either a front rotary joint or a rear rotary joint must be unlocked and locked again to carry out the two erecting movements of the rear hood. A first joint located between a first lever and a second lever must be released to raise the front edge of the rear hood. When the rear four-joint link assembly is actuated, the front edge of the rear hood that has been released from a position secured on the body can be raised. The first rotary joint is locked in a position in which it is attached to the vehicle body to open the trunk. When the front four-joint link assembly is actuated, a rear rotary joint is opened and the rear edge of the rear hood is raised.

The apparatus disclosed in DE 199 32 500A1 has a number of disadvantages. Two four-joint link assemblies are required on each side of the rear hood to open the rear hood. The two four-joint link assemblies extend over the entire side of the rear hood between the front edge and rear edge which restricts the amount of free space available.

Applicant's invention improves on the above designs as summarized below.

SUMMARY OF THE INVENTION

One aspect of the present invention is to provide a simplified rear hood for a convertible. Either a front edge or a rear edge of the rear hood may be raised either automatically or manually. A multi-joint link assembly couples the rear hood to a vehicle body. A driving element acts on the multi-joint link assembly to move the hood. A first lifting link is coupled to the driving link and the hood. The multi-joint link assembly includes a locking link that moves between a locked position and an unlocked position. When the locking link is in the locked position, a rotary joint pivots the locking link relative to the vehicle body while the locking link is on the vehicle. When a rear lock is released, the locking link is displaced to the locked position and the rear edge of the rear hood raises to allow loading and unloading of a truck of a vehicle. The locking link is displaced to the unlocked position to stow the vehicle roof. Displacement of the locking link to the unlocked position, unlocks the corresponding rotary joint and disengages the connection between the locking link and the vehicle body. The rotary joint can be coupled to the body of the vehicle. When the locking link is in the unlocked position, the rear hood can pivot open about a rear rotary joint of the rear hood to raise the front edge of the rear hood.

The multi-joint link assembly uses a single driving element to actuate both the rear edge and the front edge to raise the rear hood. The present invention eliminates the double driving elements and link assemblies used of prior art.

A driving link of the multi-joint link assembly drives the multi-joint link assembly. The driving link is articularly mounted on the vehicle body. The driving element is a hydraulic adjuster that drives the driving link. A linear, translational displaceable driving element may be used to raise the rear hood since both the rear edge and the front edge raise the rear hood along similar paths of motion. Either locking of the locking link or locking of the rear rotary joint controls whether the front edge or the rear edge raises the rear hood.

In an alternative embodiment, the multi-joint link assembly forms a seven-joint link assembly. The seven-joint link assembly includes a total of four links. One link of the total of four links forms the locking link. The locking link can be either locked to or unlocked from the vehicle body. The driving link of the seven-joint link assembly is articularly mounted on the vehicle body. A first lifting link and a second lifting link of the seven-joint link assembly are articularly mounted at opposing ends of the rear hood. The first lifting link is articulately coupled to the driving link. The second lifting link is articularly coupled to the locking link. A central rotary joint connects the locking link to the first lifting link to combine superfluous degrees of freedom of the seven-joint link assembly. The seven-joint link assembly has one degree of freedom in the locking position of the locking link so that when the driving element is actuated to raise the rear edge of the rear hood, the entire rear hood opens according to a predefined path of motion. When the locking link is in the unlocked position, the coupling of the rear hood to the rear rotary joint binds the additional degree of freedom of the seven-joint link assembly such that the rear hood opens according to a predefined path of motion when the driving element is actuated.

An link locking unit capable of being automatically actuated locks and unlocks the locking link. The link locking unit can be activated depending on the desired opening movement of the rear hood.

The rear hood can be either single-part hood or frame-free hood. The locking and unlocking of both the locking link and the rear rotary joint controls the opening movement of the rear hood.

Other advantages and useful embodiments are disclosed or suggested in the claims, the description of the figures, and the drawings.

BRIEF DESCRIPTION OF THE DRAWINGS

FIG. 7 is a side view of the rear hood having a raised front edge and the seven-joint link assembly.

DETAILED DESCRIPTION OF THE PREFERRED EMBODIMENT(S)

Figure 1:
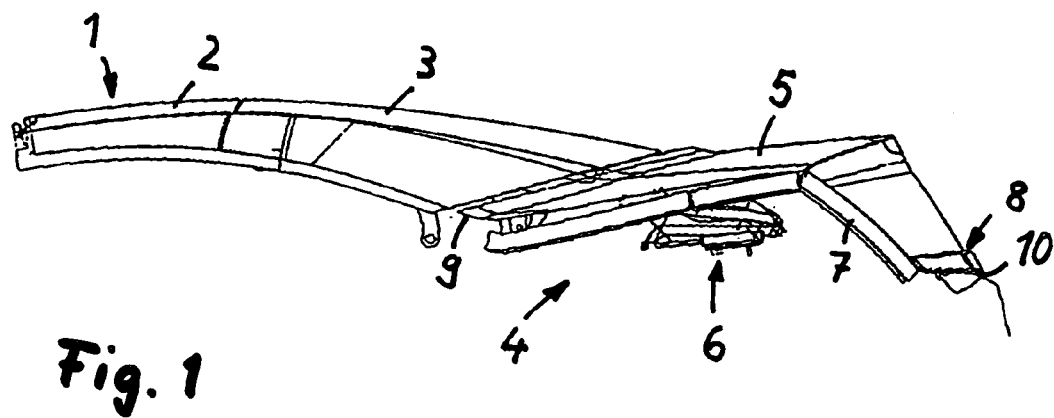
FIG. 1 is a side view of a retractable vehicle roof having a rear hood and a seven-joint link assembly where both the vehicle roof and seven-joint link assembly are in a closed position.

FIG. 1 shows a hardtop vehicle roof 1. The roof 1 has a first roof part 2 and a second roof part 3. Roof part 2 is tandemly arranged with roof part 3 in a closing direction. Both roof part 2 and roof part 3 may be moved between a closed position and a stowed position. The vehicle roof 1 may be stowed in a rear storage space or in a folding-top compartment. The rear storage space or folding-top compartment may be part of a trunk 4 or situated adjacent to the trunk 4. Alternatively, the vehicle roof 1 may be a retractable soft top having a covering material stretched on a folding-top linkage.

A rear hood 5 closes the trunk 4 of the vehicle. A multi-joint link assembly 6 couples the rear hood 5 to the vehicle body 7 to permit displacement between the rear hood 5 and the vehicle body 7. A driving element 11 drives the multi-joint link assembly 6 to displace the rear hood 5 between a rear hood closed position and a rear-hood raised position. The rear hood 5 has a rear locking part 8. The rear locking part 8 locks the rear hood 5 to the vehicle body 7 in a rear-hood closed position. The rear locking part 8 includes a piston rotary joint 13. When the multi-joint link assembly 6 is actuated, the piston rotary joint 13 pivots the rear hood 5 upward. Upward movement of the rear hood 5 raises a front edge 9 of the rear hood 5 to permit the vehicle roof 1 to be stowed in and raised out of the folding-top compartment. When the rear locking part 8 is unlocked, a rear edge 10 may be raised to permit the trunk 4 to be loaded and unloaded. The multi-joint link assembly 6 may be used to open the rear hood 5.

Figure 2:
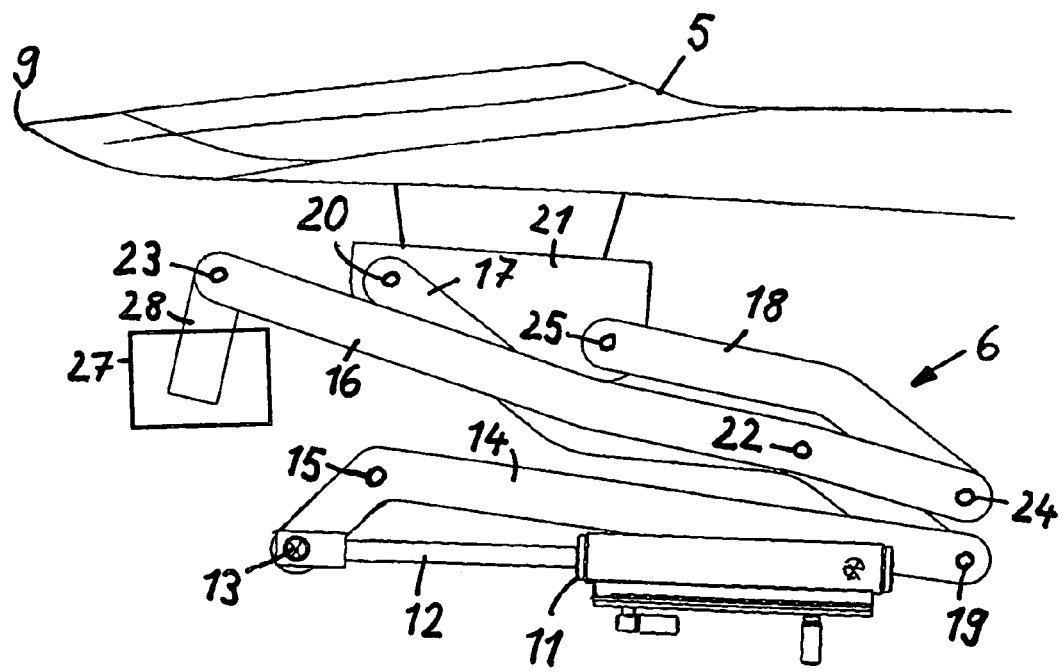
FIG. 2 is a side view of a seven-joint link assembly of the rear hood using a link locking unit to pivotal couple a locking link to the vehicle body, where the link locking unit is capable of being automatically actuated.

FIG. 2 shows the multi-joint link assembly 6 having seven joints and four links. The four links include a driving link 14, a locking link 16, a first lifting link 17 and a second lifting link 18. The driving element 11 drives the multi-joint link assembly 6. The driving element 11 is connected to the vehicle body 7. The driving element 11 is a hydraulic adjuster including a lifting piston 12 capable of translational movement. A piston rotary joint 13 articulately couples the lifting piston to the driving link 14 of the multi-joint link assembly 6. A second rotary joint 15 couples the driving link 14 to the vehicle body 7. The second rotary joint 15 is located between the driving element 11 and the driving link 14. The second rotary joint 15 is positioned relative to the piston rotary joint 13 such that torque about an axis of rotation of the second rotary joint 15 drives the driving link 14 when the driving element 11 is actuated.

A third rotary joint 19 is located on the side of the driving link 14 that is opposite the piston rotary joint 13. The third rotary joint 19 connects the driving link 14 to a first lifting link 17. A fourth rotary joint 20 connects the first lifting link 17 to a console 21. The console 21 may be connected to the rear hood 5 or form a part of the rear hood 5. A central rotary joint 22 is centrally located on the first lifting link 17. The central rotary joint 22 articulately couples the first lifting link 17 to a locking link 16 of the multi-joint link assembly 6. A flange rotary joint 23 and a seventh rotary joint 24 are located at opposing ends of the locking link 16. The flange rotary joint 23 provides a pivot connection to the vehicle body 7. The seventh rotary joint 24 pivotably connects the locking link 16 to the second lifting link 18. A eighth rotary joint 25 articulately connects the second lifting link 18 to the console 21. The multi-joint link assembly 6 includes the rotary joints 15, 19, 20, 22, 23, 24 and 25.

An end-side flange 28 connects the locking link 16 to a link locking unit 27. The link locking unit 27 abuts the vehicle body 7. The flange rotary joint 23 articulately couples the flange 28 to the locking link 16. In the locked position, the link locking unit 27 may receive the flange 28 and the locking link 16 may pivot about an axis of the flange rotary joint 23. Unlocking releases the flange 28 from the locking unit 27. When the flange 28 is released from the locking unit 27, the locking link 16 "disconnects" from the vehicle body 7 near the interface between the flange rotary joint 23 and the flange 28. The locked position permits the rear edge 10 of the rear hood 5 to be lifted. When the rear edge 10 is lifted, trunk 4 may be loaded and unloaded. The unlocked position permits the front edge 9 of the rear hood 5 to be raised. When the front edge 9 is raised, the folding top of the vehicle may be stowed or lifted out of the storage compartment. An adjusting element of the locking link unit 27 automatically locks and unlocks the locking link 16.

Figure 3:
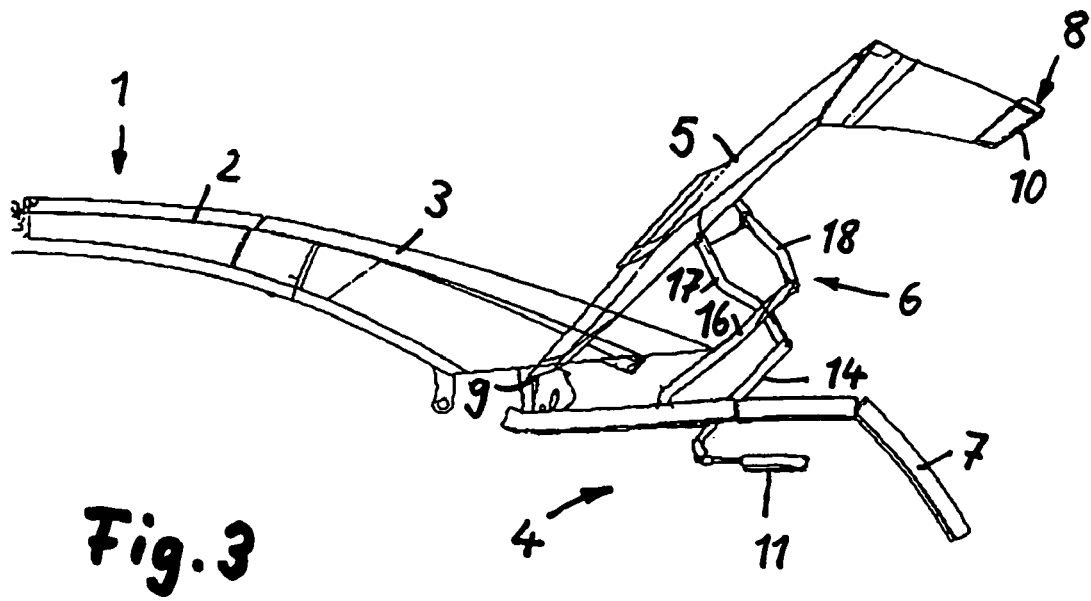
FIG. 3 is a side view of the rear hood having a rear edge of the rear hood pivoted upward for loading and unloading a trunk.

FIG. 3 shows the rear hood 5 with the vehicle roof 1 closed and the rear edge 10 raised. When the vehicle roof 1 closed and the rear edge 10 raised, the trunk 4 may be loaded and unloaded. The rear locking part 8 unlocks the rear edge 10 of the rear hood 5 from the vehicle body 7 to allow the front edge 9 to be raised. The front edge 9 raises when the driving element 11 drives the multi-joint link assembly 6 to pivot the rear hood 5 about an axis of rotation near the front edge 9 of the rear hood 5. After the rear edge 10 is raised, the locking link 16 is in the locked position and remains pivotably connected to the vehicle body 7.

Actuation of the driving element 11 may be used both to open and to close the rear hood 5. When the rear hood 5 is open, the trunk 4 may be loaded and unloaded. The rear locking part 8 may be locked and unlocked either automatically or manually.

Figure 4:
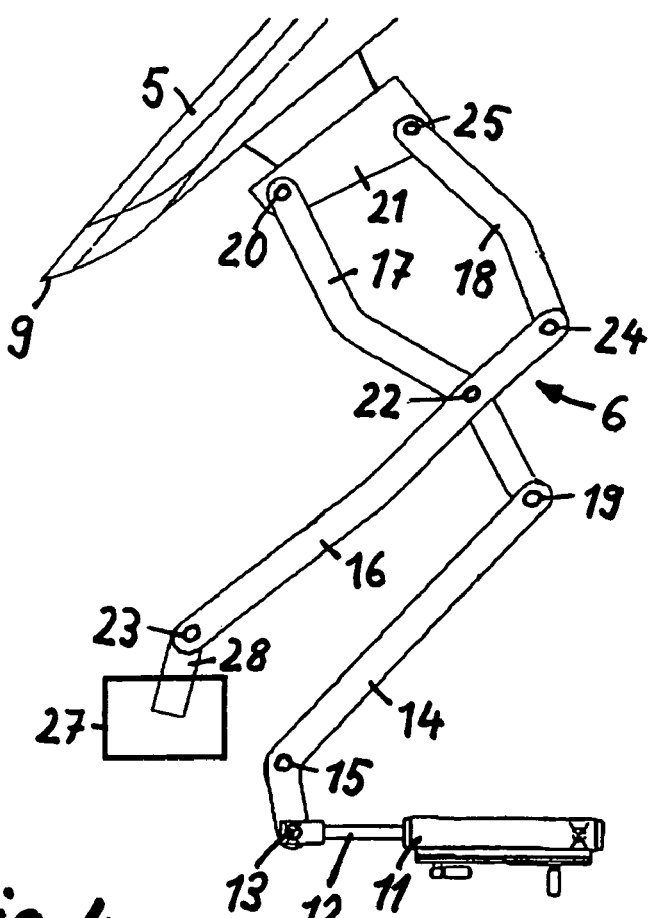
FIG. 4 is a side view of a seven-joint link assembly having a raised rear edge of the rear hood.

FIG. 4 shows the multi-joint link assembly 6 with the rear hood 5 raised. When the rear hood 5 is raised, the trunk 4 may be loaded and unloaded. The lifting piston 12 of the driving element 11 moves toward the driving element 11 to raise the rear hood 5. The lifting piston 12 moves toward the driving element 11 to pivot the driving link 14 about the second rotary joint 15. When the driving element 11 pivots the driving link 14, the multi-joint link assembly 6 lifts to erect the rear edge 10 of the rear hood 5. The second rotary joint 15 is fixed to the vehicle body 7. The flange 28 is fixed to link locking unit 27 to allow the rear hood 5 to pivot about the flange rotary joint 23. The flange rotary joint 23 is secured on the vehicle body 7.

Figure 5:
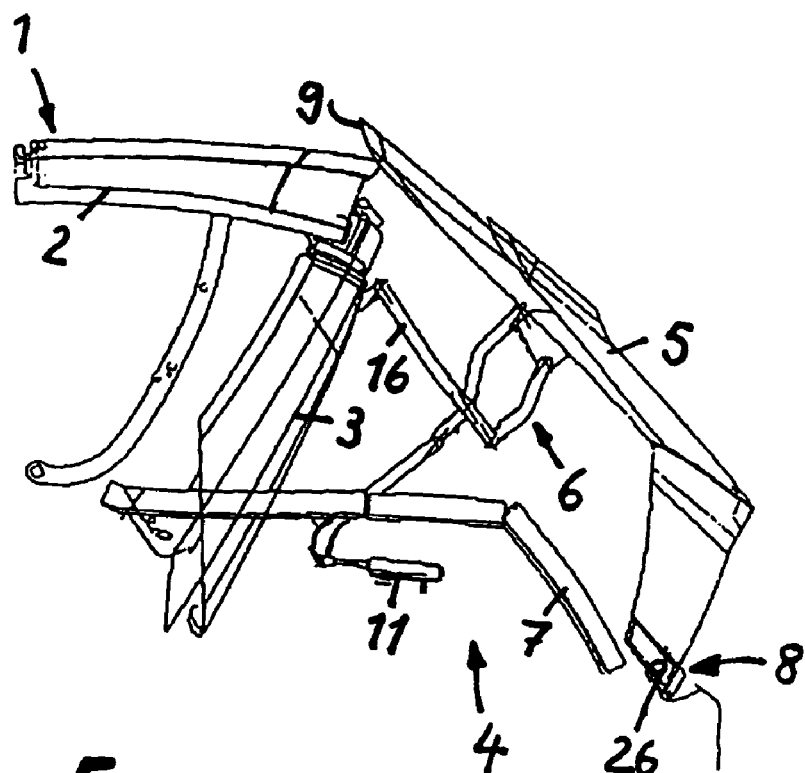
FIG. 5 is a side view of a raised front edge of the rear hood where the hard top is positioned between a closed position and a stowed position.

FIG. 5 shows an intermediate position of the vehicle roof 1 where the vehicle roof 1 is located between the closed position and the stowed position. The first roof part 2 and the second roof part 3 move in the direction of the folding-top compartment of the trunk 4. The rear hood 5 pivots about a ninth rotary joint 26 to raise the front edge 9 of the rear hood 5 and open the folding-top compartment. The ninth rotary joint 26 is part of the rear locking part 8. When the front edge 9 of the rear hood 5 is raised, the locking part 8 is in the locked position. The rear hood 5 may pivot about the ninth rotary joint 26 when the locking part 8 is in the locked position. When the locking link 16 of the multi-joint link assembly 6 is in the unlocked position, the locking link 16 does not have a direct connection to the vehicle body 7.

Figure 6:
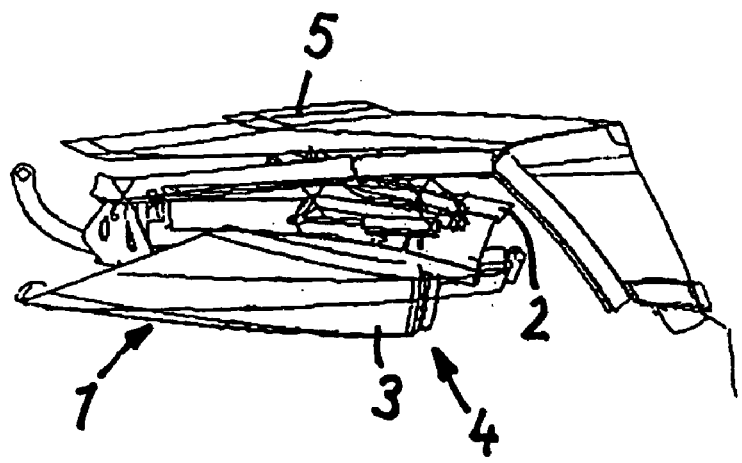
FIG. 6 is a side view of the hard top in the stowed position of the rear folding-top compartment with the rear hood closed.

FIG. 6 shows the first roof part 2 and the second roof part 3 of the vehicle roof 1 stowed in the folding-top compartment with the rear hood 5 closed. The driving element 11 may be used to keep the rear hood 5 at rest in the closed position. If both fasteners are locked, the drive does not need to be locked.

FIG. 7 shows the rear hood 5 and the multi-joint link assembly 6 with the front edge 9 raised. The flange 28 unlocks from the link locking unit 27 to allow the front part of the locking unit 16 to be raised. The connection of the rear hood 5 to the ninth rotary joint 26 constrains the additional degree of freedom, which is introduced when the flange 28 unlocks from the link locking unit 27, of the multi-joint link assembly 6. The lifting piston 12 of the driving element 11 retracts into the driving element 11 to raise the front edge 9 of the rear hood 5.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A rear hood assembly for a convertible, comprising:
    a hood having a front edge facing an interior of a vehicle that is raised by pivoting about a rear pivot for storing the convertible top, the hood having a rear edge adjacent to a rear portion of the vehicle that is raised for loading and unloading a trunk of the vehicle;
    a scissored multi-joint link assembly that connects a body portion of the vehicle and the hood;
    a driving element acting on a driving link of the multi-joint link assembly for moving the hood between a closed position and a raised position;
    a first lifting link articulately coupled on one end to the driving link and articulately connected on another end to the hood;
    a locking link articulately coupled at a first end to the vehicle body and at a second end to a second lifting link, the locking link also being coupled by a central rotary joint to the first lifting link at an intermediate point located on the first lifting link between the driving link and the hood, and located on the locking link between the vehicle body and the second end;
    wherein the second lifting link is connected on one end to the locking link and is connected on a second end to the hood; and
    wherein the locking link is movable between a locked position and an unlocked position, the locking link in the locked position being pivotably coupled to the vehicle body by a rotary joint for raising the rear edge of the hood and in the unlocked position the rotary joint is unlocked.

2. The rear hood assembly according to claim 1, wherein the driving element moves the driving link by retracting a piston to extend the linkage, and the driving link is mounted in an articulated manner on the vehicle body.

3. The rear hood assembly according to claim 1, wherein the locking link may be locked and unlocked by an automatically actuated link locking unit, wherein the link locking unit has an end-side flange connecting the locking link to the link locking unit, wherein in the locked position the locking link pivots about an axis of the flange.

4. The rear hood assembly according to claim 1, wherein the driving element is a hydraulic cylinder.

5. The rear hood assembly according to claim 1, wherein the rear hood is a single part that does not include a frame or other connections to the scissored link assembly except a console.

6. The rear hood assembly according to claim 1, wherein the driving element moves the driving link in the same direction to either raise the front edge or the rear edge when the driving element is actuated.

7. The rear hood assembly according to claim 1, wherein the roof is a hardtop roof having at least two rigid roof parts that can be moved between a closed position and a stowed position, wherein the roof parts are stowed in a rear folding-top compartment and the rear hood can be used to close the folding-top compartment.

8. A rear hood assembly for a vehicle having a convertible top, the hood assembly comprising:
   a hood;
   an extensible linkage connecting the hood to the vehicle, including a driving element secured to the vehicle and pivotably connected at a first end of the driving element to a first end of a driving link, the driving link is pivotably secured to the vehicle at a first rotary joint located between the first end of the driving link and a second end of the driving link, the driving link is pivotably connected at the second end of the driving link to a first end of a first lifting link, a second end of the first lifting link is pivotably connected to the hood, a locking link pivotably connects at a first end of the locking link to a link locking unit secured to the vehicle and pivotably connects at a second end of the locking link to a first end of a second lifting link, the locking link further pivotably connects to the first lifting link at a second rotary joint located at an intermediate point on the locking link and an intermediate point on the first lifting link, a second end of the second lifting link pivotably connects to the hood;
   a selectively locked rear pivot that may be locked to pivotally secure a rear edge of the hood to the vehicle and may be unlocked to permit the front edge of the hood to be raised by the linkage, wherein the rear pivot includes a third rotary joint that constrains the additional degree of freedom introduced when a flange unlocks from the link locking unit;
   a selectively locked front pivot that may be locked to pivotally secure a front edge of the hood to the vehicle and may be unlocked to permit the rear of the hood to be raised by the linkage;
   a drive operatively connected to the linkage that selectively raises and lowers the front edge of the hood when the rear pivot is locked and the front pivot is unlocked, wherein the drive also selectly raises and lowers the rear edge of the hood when the front pivot is locked and the rear pivot is unlocked.

9. The rear hood assembly of claim 8 wherein the front edge of the hood is raised to provide access to a top stowage compartment for storing the convertible top and for deploying the convertible top.

10. The rear hood assembly of claim 9 wherein the convertible top is a retractable hardtop.

11. The rear hood assembly of claim 8 wherein the extensible linkage further comprises a four bar linkage and a seven-joint link assembly, wherein the four bar linkage has a first side that is selectively locked by the rear pivot to be pivoted rearward with the hood and a second side that is selectively locked by the front pivot to be pivoted forward with the hood, wherein the first and second sides form opposite sides of the four bar linkage, wherein the combination of the locked four bar linkage and the seven-joint link assembly provides only one degree of freedom in the locking position of the locking link.

12. The rear hood assembly of claim 11 wherein the drive is connected to the four bar linkage by a drive link that operatively engages the four bar linkage to extend and retract the linkage and thereby raise and lower the hood.

13. The rear hood assembly of claim 8 wherein the drive is connected to the extensible linkage by a drive link that is used to both extend and retract the linkage and thereby raise and lower both the front edge and the rear of the hood.

14. The rear hood assembly of claim 8 wherein the extensible linkage is secured to the hood between the front pivot and the rear pivot.

15. The rear hood assembly of claim 8 wherein the drive is secured to the vehicle between the front pivot and the rear pivot.

* * * * *